(12) United States Patent
Basso et al.

(10) Patent No.: US 7,606,166 B2
(45) Date of Patent: Oct. 20, 2009

(54) SYSTEM AND METHOD FOR COMPUTING A BLIND CHECKSUM IN A HOST ETHERNET ADAPTER (HEA)

(75) Inventors: Claude Basso, Raleigh, NC (US); Jean Louis Calvignac, Raleigh, NC (US); Chih-jen Chang, Apex, NC (US); Philippe Damon, Raleigh, NC (US); Ronald Edward Fuhs, Rochester, MN (US); Natarajan Vaidhyanathan, Carrboro, NC (US); Fabrice Jean Verplanken, La Gaude (FR); Colin Beaton Verrilli, Apex, NC (US); Scott Michael Willenborg, Stewartville, MN (US)

(73) Assignee: International Business Machines Corporation, Armonk, NY (US)

(*) Notice: Subject to any disclaimer, the term of this patent is extended or adjusted under 35 U.S.C. 154(b) by 486 days.

(21) Appl. No.: 11/097,430

(22) Filed: Apr. 1, 2005

(65) Prior Publication Data
US 2006/0221969 A1    Oct. 5, 2006

(51) Int. Cl.
*H04L 12/66* (2006.01)
(52) U.S. Cl. .................... 370/252; 370/392
(58) Field of Classification Search .............. 370/463, 370/401, 392, 474, 389, 466, 229, 230, 235, 370/252, 351; 709/230, 224
See application file for complete search history.

(56) References Cited

U.S. PATENT DOCUMENTS

| | | | |
|---|---|---|---|
| 5,058,110 A | 10/1991 | Beach et al. | |
| 5,430,842 A | 7/1995 | Thompson et al. | |
| 5,752,078 A | 5/1998 | Delp et al. | |
| 6,400,730 B1 | 6/2002 | Latif et al. | |
| 6,427,169 B1 * | 7/2002 | Elzur | 709/224 |
| 6,650,640 B1 | 11/2003 | Muller et al. | |
| 6,658,002 B1 * | 12/2003 | Ross et al. | 370/392 |
| 6,678,746 B1 | 1/2004 | Russell et al. | |
| 6,724,769 B1 | 4/2004 | Sang | |

(Continued)

FOREIGN PATENT DOCUMENTS

WO        03049488 A1      6/2003

OTHER PUBLICATIONS

Balena, F., "Speed Up Searched With Hash Tables," Nov. 13, 2001, DevX.com, all pages.

(Continued)

*Primary Examiner*—Kwang B Yao
*Assistant Examiner*—Anh Ngoc Nguyen
(74) *Attorney, Agent, or Firm*—Sawyer Law Group P.C.

(57) ABSTRACT

A system and method for computing a blind checksum includes a host Ethernet adapter (HEA) with a system for receiving a packet. The system determines whether or not the packet is in Internet protocol version four (IPv4). If the packet is not in IPv4, the system computes the checksum of the packet. If the packet is in IPv4, the system determines whether the packet is in transmission control protocol (TCP) or user datagram protocol (UDP). If the packet is not in either of TCP or UDP the system attaches a pseudo-header to the packet and computes the checksum of the packet based on the pseudo-header and the IPv4 standard.

15 Claims, 2 Drawing Sheets

U.S. PATENT DOCUMENTS

| | | |
|---|---|---|
| 6,728,929 B1 | 4/2004 | Luong |
| 6,735,670 B1 | 5/2004 | Bronstein et al. |
| 6,751,229 B1 | 6/2004 | Waller et al. |
| 6,754,662 B1 | 6/2004 | Li |
| 6,788,697 B1 | 9/2004 | Aweya et al. |
| 6,822,968 B1 | 11/2004 | Lim |
| 6,954,463 B1* | 10/2005 | Ma et al. ............ 370/401 |
| 6,976,205 B1 | 12/2005 | Ziai et al. |
| 6,988,235 B2 | 1/2006 | Brown |
| 7,023,811 B2 | 4/2006 | Pinto |
| 7,031,304 B1 | 4/2006 | Arberg et al. |
| 7,098,685 B1 | 8/2006 | Agrawal et al. |
| 7,124,198 B2 | 10/2006 | Pinkerton |
| 7,134,796 B2 | 11/2006 | Anderson |
| 7,164,678 B2 | 1/2007 | Connor |
| 7,218,632 B1 | 5/2007 | Bechtolsheim et al. |
| 7,251,704 B2 | 7/2007 | Solomon |
| 7,260,120 B2 | 8/2007 | Kang et al. |
| 7,269,661 B2* | 9/2007 | Ree et al. ............ 709/230 |
| 7,271,706 B2 | 9/2007 | Lee |
| 7,272,704 B1 | 9/2007 | Nguyen et al. |
| 7,274,706 B1 | 9/2007 | Nguyen et al. |
| 7,283,528 B1 | 10/2007 | Lim et al. |
| 7,292,586 B2 | 11/2007 | Dewan et al. |
| 7,292,591 B2 | 11/2007 | Parker et al. |
| 7,295,553 B2 | 11/2007 | Saitoh |
| 7,308,006 B1 | 12/2007 | Banerjee et al. |
| 2001/0027496 A1 | 10/2001 | Boucher et al. |
| 2003/0088689 A1 | 5/2003 | Alexander et al. |
| 2003/0103499 A1 | 6/2003 | Davis et al. |
| 2003/0227920 A1 | 12/2003 | Benayoun et al. |
| 2004/0022094 A1 | 2/2004 | Radhakrishnan et al. |
| 2004/0030766 A1 | 2/2004 | Witkowski |
| 2004/0064590 A1 | 4/2004 | Starr et al. |
| 2004/0081145 A1 | 4/2004 | Harrekilde-Petersen et al. |
| 2004/0100952 A1 | 5/2004 | Boucher et al. |
| 2004/0109465 A1 | 6/2004 | Kim et al. |
| 2004/0218623 A1* | 11/2004 | Goldenberg et al. ........ 370/463 |
| 2005/0076136 A1 | 4/2005 | Cho et al. |
| 2005/0089031 A1 | 4/2005 | Krueger |
| 2005/0108611 A1 | 5/2005 | Vogt |
| 2005/0114663 A1 | 5/2005 | Cornell et al. |
| 2005/0120160 A1 | 6/2005 | Plouffe et al. |
| 2005/0149677 A1 | 7/2005 | Shimada et al. |
| 2005/0256975 A1 | 11/2005 | Kaniz et al. |
| 2006/0120289 A1 | 6/2006 | Cunningham |
| 2006/0187928 A1 | 8/2006 | McGee et al. |
| 2006/0216958 A1 | 9/2006 | Yee et al. |

OTHER PUBLICATIONS

Kung, H.T., Gigabit Local Area Networks: A System Perspective, Apr. 1992, IEE Communications Magazine, vol. 30, Issue 4, pp. 79-89.

Cunningham, D.G., The Status of the 10-Gigabit Ethernet Standard, Sep. 30, 2001, 27th European Conference on Optical Communication, 2001. ECOC '01, vol. 3, pp. 364-367.

IP Com, Reusing a 10Gbps Ethernet Media Access Controller for a 1Gbps/100Mbps Ethernet, located at www.ip.com, IP.com No. IPCOM000133402D, Jan. 25, 2006, 6 pages.

Adolf, Geier, Patent Cooperation Treaty: PCT Notification of transmittal of the International Preliminary Report on Patentability (PCT Rule 71.1), European Patent Office, Apr. 13, 2007, 7 pages.

Rummery, Audrey, Patent Cooperation Treaty: PCT Notification of Transmittal of the International Search Report and the Written Opinion of the International Searching Authority, or the Declaration (PCT Rule 44.1), European Patent Office, Jul. 5, 2006, 11 pages.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

Mazzucco, The Fundamentals of Cache, SystemLogic.Net, Oct. 17, 2000.

* cited by examiner

SYSTEM AND METHOD FOR COMPUTING A BLIND CHECKSUM IN A HOST ETHERNET ADAPTER (HEA)

FIELD OF THE INVENTION

The present invention relates to Ethernet adapters generally, and specifically to a system and method for computing a blind checksum in a host Ethernet adapter (HEA).

CROSS-REFERENCE TO RELATED APPLICATIONS

The present application is related to the following copending U.S. patent applications:

U.S. patent application Ser. No. 11/097,608, entitled "Host Ethernet Adapter for Networking Offload in Server Environment", filed on even date herewith and assigned to the assignee of the present invention.

U.S. patent application Ser. No. 11/097,608, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application Ser. No. 11/096,571, entitled "Method and Apparatus for Providing a Network Connection Table", filed on even date herewith and assigned to the assignee of the present invention.

U.S. patent application Ser. No. 11/097,051, entitled "Network Communications for Operating System Partitions", filed on even date herewith and assigned to the assignee of the present invention.

U.S. patent application Ser. No. 11/097,652, entitled "Configurable Ports for a Host Ethernet Adapter", filed on even date herewith and assigned to the assignee of the present invention.

U.S. patent application Ser. No. 11/096,365, entitled "System and Method for Parsing, Filtering, and Computing the Checksum in a Host Ethernet Adapter (HEA)", filed on even date herewith and assigned to the assignee of the present invention.

U.S. patent application Ser. No. 11/096,353, entitled "System and Method for a Method for Reducing Latency in a Host Ethernet Adapter (HEA)", filed on even date herewith and assigned to the assignee of the present invention.

U.S. patent application Ser. No. 11/097,055, entitled "Method and Apparatus for Blind Checksum and Correction for Network Transmissions", filed on even date herewith and assigned to the assignee of the present invention.

U.S. patent application Ser. No. 11/096,362, entitled "Method and System for Performing a Packet Header Lookup", filed on even date herewith and assigned to the assignee of the present invention.

BACKGROUND OF THE INVENTION

A computer, or host, connects to a network through an adapter that parses, or separates, each packet received over the network. The adapter may be known as a host Ethernet adapter (HEA). A Internet protocol (IP) packet is composed of an Internet protocol (IP) header and some data. A calculation called a "checksum" is performed on each packet in order to check its integrity, i.e. to make sure the packet has not changed during transmission. The checksum calculated on TCP/UDP packets is referred to as an "Internet Checksum".

The host performs the checksum computation, which is processor and time intensive. In order to decrease the computing load on the host, the checksum computation could be moved to the adapter. However, the number of protocols the adapter would need to have very precise knowledge of makes this impractical.

Accordingly, what is needed is a system and method for computing a blind checksum in a host Ethernet adapter (HEA). The present invention addresses such a need.

BRIEF SUMMARY OF THE INVENTION

The present invention includes a system and method for computing a blind checksum in a host Ethernet adapter (HEA) with a system for receiving a packet. The system determines whether or not the packet is in Internet protocol version four (IPv4). If the packet is not in IPv4, the HEA computes the checksum of the packet. If the packet is in IPv4, the system determines whether the packet is in transmission control protocol (TCP) or user datagram protocol (UDP). If the packet is not in either of TCP or UDP the system attaches a pseudo-header to the packet and computes the checksum of the packet based on the pseudo-header and the IPv4 standard.

The HEA is configured to perform checksum computations on IPv4, in TCP or UDP, which are common protocols. However, in order to offload nearly all the checksum computations from the host to the HEA, the HEA is additionally able to compute a "blind" checksum, or a checksum upon a protocol that the HEA does not recognize. Because the checksum is done without information regarding the protocol, some additional checksum computation may need to be performed by the host when it receives the packet. However, this additional computation is significantly less than what the host would have to do without the blind checksum computation in the HEA.

DETAILED DESCRIPTION OF THE INVENTION

The present invention relates to a system and method for computing a blind checksum in a host Ethernet adapter (HEA). The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
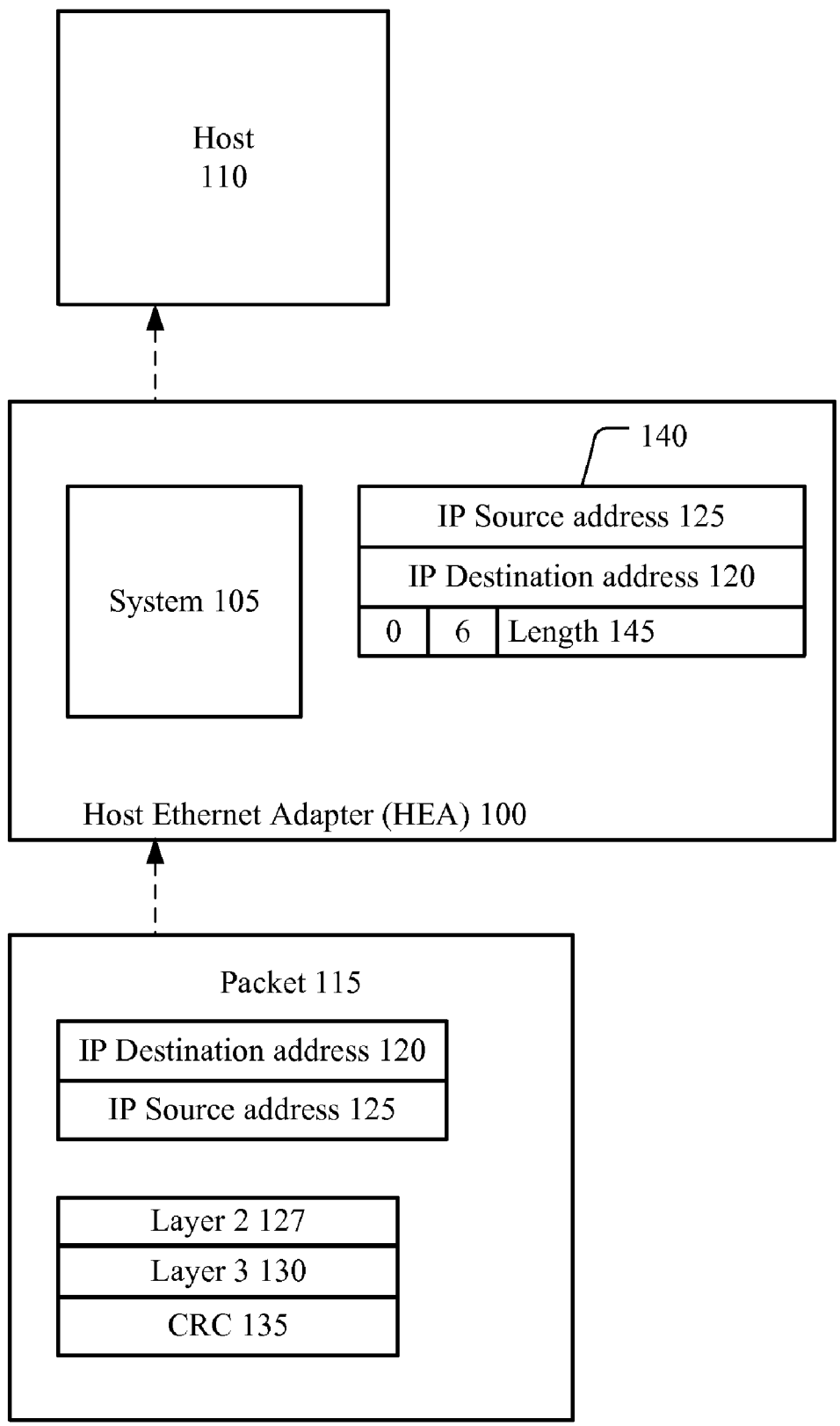
FIG. 1 is a block diagram illustrating a host Ethernet adapter (HEA) according to one embodiment of the invention.

FIG. 1 is a block diagram illustrating a host Ethernet adapter (HEA) 100 according to one embodiment of the invention. The HEA 100 includes a system 105 for performing blind checksum computations. The HEA 100 is connected to a host 110 and receives packets 115 over an Ethernet connection (not shown).

The packets 115 may be in different protocols, for example Internet protocol (IP) version 4 (IPv4) and IPv6. If the packets 115 are in IPv4 then they will have a IP destination address 120 and a IP source address 125. The packets 115 will have a layer-2 127 and a layer 3 130. At the end of layer 3 there is a cyclic redundancy check (CRC) 135 for error checking.

Figure 2:
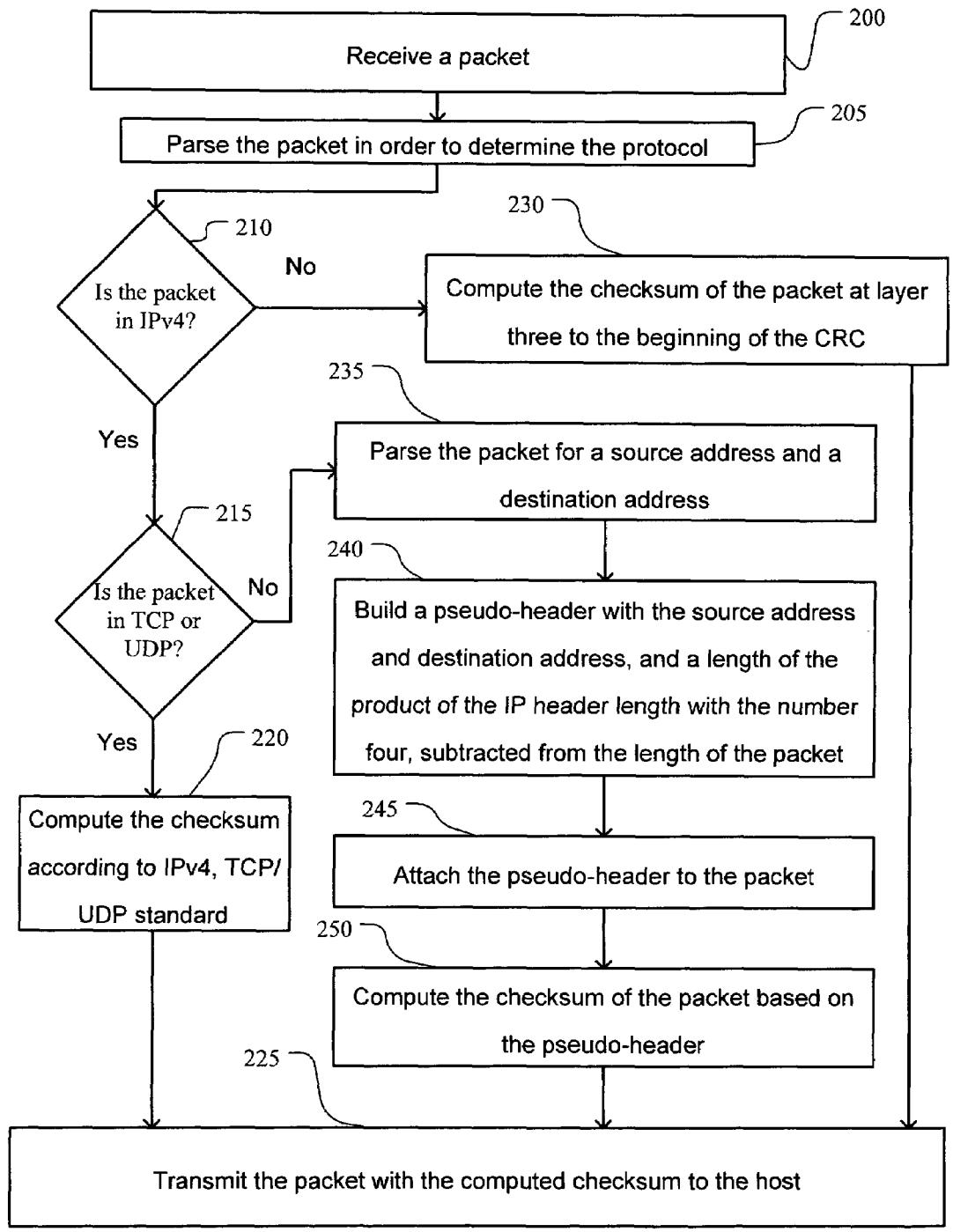
FIG. 2 is a flow diagram illustrating one embodiment of the invention implemented in the diagram of FIG. 1.

FIG. 2 is a flow diagram illustrating one embodiment of the invention implemented in the diagram of FIG. 1. FIG. 2 will be discussed in conjunction with FIG. 1. In block 200 of FIG. 2, HEA 100 receives the packet 115. In block 205, the system 105 of HEA 100 parses the packet 115 in order to determine the protocol.

The following paragraph is the path for computation of a packet 115 in IPv4, TCP or UDP, which is not a blind checksum if the HEA 100 has the information for IPv4, TCP/UDP checksum computation. In block 210, after parsing the packet 115, the system 105 determines if the packet 115 is in IPv4. If the packet is in IPv4, then in block 215 the system 105 further parses the packet 115 and determines if the layer-3 payload 130 of packet 115 is in transmission control protocol (TCP) or user datagram protocol (UDP). If the layer-3 payload 130 of packet 115 is in TCP or in UDP, then in block 220 the system 105 computes the checksum according to IPv4, TCP/UDP standards established by the Internet Engineering Task Force (IETF). The packet 115 with the computed checksum may then be transferred on to the host 110, either as it is received and computed or once all relevant packets 115 have been received, in block 225. The path through blocks 210, 215, 220 and 225 is not a blind checksum computation because HEA 100 has the information necessary in order to compute the checksum of the packet 115 according to the IPv4, TCP/UDP standard. In the following is one embodiment according to the invention, where the checksum computation for the received packet 115 is in a protocol unknown to the HEA 100. One skilled in the art will appreciate how the invention may be modified for blind checksum computation of IPv4 TCP/UDP as well.

If the packet 115 is not IPv4 in block 210, then in block 230 the system 105 computes the checksum of the packet 115 over the layer-2 (Ethernet payload) 127, to the beginning of the CRC 135. In block 225, HEA 100 may transmit the packet 115 with the computed checksum to the host 110. When the host receives the packet 115 with the computed checksum, the host 110 may parse the packet and determine the protocol and appropriate checksum computation. The host 110 may need to subtract some of the checksum computed by HEA 100, or the host 110 may need to add some additional checksum computations. In either case, the amount of checksum computation done by the host 110 is significantly less than when the host 110 performs the entire checksum computation itself.

If the packet 115 is IPv4, but is not TCP or UDP according to block 215, then in block 235, the system 105 parses the packet 115 for the source IP address 125 and the destination IP address 120 (which are present because the packet 115 is IPv4).

In block 240, the system 105 builds a pseudo-header 140 with the IP source address 125, the IP destination address 120, and a length 145. One definition for the length is the total length of the packet 115 subtracted by the length of the IP header field in the IP header multiplied by four. As a formula, the expression may be: length 145=Total length of packet 115−(IP header length*4). The protocol field in the IP header 148 indicates whether the pseudo-header is TCP or UDP.

In block 245 the system 105 attaches the pseudo-header 140 to the packet 115 and in block 250 computes the checksum of the packet 115 based on the pseudo-header, according to the TCP/UDP standard. Then in block 225 the HEA 100 may transmit the packet 115 with the computed checksum to the host 110.

According to the method and system disclosed herein, the present invention discloses a system and method for computing a blind checksum in a host Ethernet adapter (HEA). One skilled in the art will recognize that the particular standards used are exemplary, and any bandwidth-limited network may apply the invention in the above manner. The present invention has been described in accordance with the embodiments shown, and one of ordinary skill in the art will readily recognize that there could be variations to the embodiments, and any variations would be within the spirit and scope of the present invention. For example, the present invention can be implemented using a computer readable medium encoded with computer-executable programming instructions. Accordingly, many modifications may be made by one of ordinary skill in the art without departing from the spirit and scope of the appended claims.

We claim:

1. A method for computing a blind checksum in a host Ethernet adapter (HEA) comprising:

receiving a packet in the HEA;

determining whether the packet is in Internet protocol version four (IPv4) the packet having an IP header;

computing by the HEA, if the packet is not in IPv4, the checksum of the packet;

determining, if the packet is in IPv4, whether the packet is in transmission control protocol (TCP) or user datagram protocol (UDP);

parsing the packet for a source address and a destination address;

building the pseudo-header with the source address and the destination address;

giving the pseudo-header a length of the product of the IP header length field in the IPv4 Header with the number four, subtracted from the "Total Length" field in the IP header;

attaching, if the packet is in IPv4 and not in either of TCP or UDP, the pseudo-header to the packet; and computing by the HEA, if the packet is in IPv4 and not in either of TCP or UDP, the checksum of the packet based on the pseudo-header and the IPv4 standard.

2. The method of claim 1, determining whether the packet is in IPv4 further comprising:

parsing the IP header in order to determine the protocol.

3. The method of claim 1, the packet further having a cyclic redundancy check (CRC), computing by the HEA, if the packet is not in IPv4 further comprising:

computing the checksum of layer three to the beginning of the CRC.

4. The method of claim 1, computing by the HEA, if the packet is not in IPv4 further comprising:

computing by the HEA, if the packet is not in IPv4, the checksum of the packet over a layer-2 payloads.

5. The method of claim 1, determining, if the packet is in IPv4 further comprising:

determining, if the packet is in IPv4, whether a layer-3 payload of the packet is in transmission control protocol (TCP) or user datagram protocol (UDP).

6. A computer readable medium encoded with computer-executable programming instructions for computing a blind checksum in a host Ethernet adapter (HEA), the programming instructions comprising:

receiving a packet in the HEA;

determining whether the packet is in Internet protocol version four (IPv4) packet having an IP header;

computing by the HEA, if the packet is not in Ipv4, the checksum of the packet;

determining, if the packet is in IPv4, whether the packet is in transmission control protocol (TCP) or user datagram protocol (UDP);

parsing the packet for a source address and a destination address;

building the pseudo-header with the source address and the destination address;

giving the pseudo-header a length of the product of the IP header length field in the IPv4 Header with the number four, subtracted from the "Total Length" field in the IP header;

attaching, if the packet is in Ipv4 and not in either of TCP or UDP, the pseudo-header to the packet; and computing by the HEA, if the packet is in Ipv4 and not in either of TCP or UDP, the checksum of the packet based on the pseudo-header and the IPv4 standard.

7. The computer readable medium of claim 6, determining whether the packet is in IPv4 further comprising:

parsing the packet in order to determine the protocol.

8. The computer readable medium of claim 6, the packet further having a cyclic redundancy check (CRC), computing by the HEA, if the packet is not in IPv4 further comprising:

computing the checksum of the packet at layer three to the beginning of the CRC.

9. The computer readable medium of claim 6, computing by the HEA, if the packet is not in IPv4 further comprising:

computing by the HEA, if the packet is not in IPv4, the checksum of the packet over a layer-2 payload.

10. The computer readable medium of claim 6, determining, if the packet is in IPv4 further comprising:

determining, if the packet is in IPv4, whether a layer-3 payload of the packet is in transmission control protocol (TCP) or user datagram protocol (UDP).

11. A system for computing a blind checksum comprising:

a host; and a host Ethernet adapter (HEA) for receiving a packet, determining whether the packet is in Internet protocol version four (IPv4), the packet having an IP header, computing, if the packet is not in IPv4, the checksum of the packet, determining, if the packet is in Ipv4, whether the packet is in transmission control protocol (TCP) or user datagram protocol (UDP), parsing the packet for a source address and a destination address, for building the pseudo-header with the source address and the destination address, giving the pseudo-header a length of the product of the IP header length field in the Ipv4 Header with the number four, subtracted from the "Total Length" field in the IP header, attaching, if the packet is in IPv4 and not in either of TCP or UDP, the pseudo-header to the packet, and computing, if the packet is in IPv4 and not in either of TCP or UDP, the checksum of the packet based on the pseudo-header and the IPv4 standard.

12. The system of claim 11, wherein the HEA further parses the packet in order to determine the protocol.

13. The system of claim 11, the packet further having a cyclic redundancy check (CRC), wherein the HEA further computes the checksum of the packet at layer three to the beginning of the CRC.

14. The system of claim 11, wherein the HEA further computes if the packet is not in IPv4, the checksum of the packet over a layer-2 payload.

15. The system of claim 11, wherein the HEA further determines if the packet is in IPv4, whether a layer-3 payload of the packet is in transmission control protocol (TCP) or user datagram protocol (UDP).

* * * * *

UNITED STATES PATENT AND TRADEMARK OFFICE
CERTIFICATE OF CORRECTION

PATENT NO. : 7,606,166 B2  Page 1 of 1
APPLICATION NO. : 11/097430
DATED : October 20, 2009
INVENTOR(S) : Basso et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this

Fifth Day of October, 2010

David J. Kappos
*Director of the United States Patent and Trademark Office*